UNITED STATES PATENT OFFICE.

PAUL G. L. G. DESIGNOLLE, OF PARIS, FRANCE.

AMALGAMATING METALS.

SPECIFICATION forming part of Letters Patent No. 228,970, dated June 15, 1880.

Application filed October 10, 1879.

*To all whom it may concern:*

Be it known that I, PAUL GUSTAVE LOUIS GABRIEL DESIGNOLLE, of Paris, in the Republic of France, have made a certain new and useful Improvement in Amalgamating Metals, specially designed for treating ores and other materials containing gold and silver, of which improvement the following is a full, clear, and exact description, sufficient to enable those skilled in the art to which it appertains to make and use the same.

This invention relates more particularly to the extraction of gold and other precious metals contained in a fine state of division in ores or other materials, such as auriferous schists, and it is applicable to the treatment of ores of the precious metals generally, including what are known as "sulphurets." It effects great saving in the gold, as by it as high as ninety-nine per cent. of the amalgamable gold contained in the ore can be collected.

In operating with the apparatus now in use these particles of gold escape either by failure to become amalgamated or by being carried off in the waste. Moreover, the gangue divides the mercury so finely that it is held in suspension in the mass and passes off with the waste materials. There is therefore a loss both of gold and mercury.

The ores called "sulphurets," without preliminary treatment, cannot be amalgamated by the methods of treatment heretofore known and used.

In this invention the amalgamation of the metallic particles is effected by electro-chemical means, and in order to obviate the defects above noted I have combined chemical and physical means for retaining the gold, and also the mercury.

It is well known as a test for gold that when placed in contact with a solution of a salt of mercury and touched with a needle or iron instrument the mercury salt is decomposed and the gold becomes amalgamated. Processes have been heretofore devised in which it has been proposed to apply this principle to the amalgamation of gold or precious metals contained in ores or mixed with other foreign matters. By these processes the amalgamation sought for has not, however, been produced in such a manner as to be of practical service in the art.

They are as follows: In the first method the ore or other material, previously roasted or otherwise treated to bring it to the proper condition for amalgamation, is introduced into a mixing apparatus provided with plates of iron, copper, or zinc, with the addition of a solution of a mercury salt in water, and with or without metallic mercury.

The originator of this process conceived that the gold coming into contact with the iron or other plates would be amalgamated in virtue of an electro-chemical reaction, which would cause the decomposition of the mercury salt; but under the conditions described no complete amalgamation can take place.

It is, as I have discovered, necessary that there should be absolute contact of the iron with the gold particles and an energetic trituration, which the mixer or malaxator, whatever its construction, cannot accomplish.

With regard, however, to the zinc and copper plates, I would say, in addition, that in presence of these metals the decomposition of the salt takes place without electro-chemical agency, and that by this decomposition it is the copper or zinc which is amalgamated, and not the gold.

In the second and only other method of the kind to me known zinc or iron filings are to be mixed with the ore, wetted with a solution of a soluble salt of mercury, (bisulphate,) the filings being in proportion to the quantity of gold contained in the ore. With zinc, as I have already stated, it, and not the gold, is amalgamated, and the necessary intimate contact, which should be as perfect as possible, of the gold particles with the filings of either zinc or iron would not be effected. For the quantities of gold twenty-five to one hundred grams in a ton of ore, (one thousand kilograms,) and of the filings one hundred grams, are so small that it would be impossible that each particle of one metal should come into contact with a particle of the other. If the quantity of iron filings were increased sufficiently to accomplish this result, the cost of extraction would exceed the value of the precious metal. Moreover, in no case would a sufficiently intimate contact be insured.

In neither of the methods described are there any efficient means for separating and collecting from the mass of gangue the amalgamated particles of gold or precious metal which may exist. In this invention the necessary conditions discovered by me are applied, and under them there takes place a true electro-chemical reaction, by virtue of which there is a positive and certain amalgamation of particles of gold or precious metal; and also application is made of the physical properties of the gold amalgam, and of any precipitated mercury as well, for their collection. Extreme division of the ore, the inevitable amalgamation of the gold or precious metal therein contained, and the separation and fixation of the amalgam disseminated in the gangue are secured. Grinding or pulverizing apparatus of iron act upon the ore or other material containing the gold previously mixed with a solution of salt of mercury, and the intimate contact of the particles of gold with the iron is secured, so that the electro-chemical reaction is set up.

The solution preferably employed is the bichloride of mercury, (corrosive sublimate,) to which has been added chloride of sodium (common salt) or hydrochloric acid, which solution has never, so far as I am aware, been used in the amalgamation of gold or other precious metals contained in ores, and the application of which constitutes a part of this invention. The chloride of sodium prevents the precipitation of the mercury as protochloride, (calomel,) and it is found to have a valuable effect in releasing the gold, especially when contained in sulphurets, to the treatment of which, as I have before stated, my invention is applicable.

The collection of the particles of amalgam or precipitated mercury is effected by means of amalgamated plates, which have, however, been employed in other connections. In order that this part of my invention may be better understood, attention is called to the following facts in a physical point of view.

First, that mercury or amalgamated metal plates have a very great attraction for the globules of mercury, however divided they may be.

Second, that the attraction of mercury or amalgamated metal plates is greater for amalgamated than for native gold, especially when it is much subdivided.

Third, that the particles of native gold in suspension in water have often only the smallest contact with the amalgamated plates, do not adhere sufficiently, and are carried off, so that they escape the dissolving action of the mercury, and consequently are not retained. This cannot happen with particles of gold previously amalgamated, as they instantly attach themselves to the mercury of the plates, with which they incorporate themselves, spreading like drops of oil upon a sheet of paper.

Fourth, that given gold in a state as fine as it can be reduced, a preliminary amalgamation will have, as a necessary consequence, the increase in weight of each of the small particles, which increase is eminently favorable to the separation of the same from the gangue, and the effect of the treatment will be the more apparent the greater the division of the gold in the ore.

Fifth, that from the mechanical action in pulverization the particles of gold are, on account of their malleability, reduced to the form of very thin plates or disks, which float or are held in suspension in the liquid, and thus escape amalgamation in apparatus now employed, whereas the preliminary amalgamation, such as I indicate, has the effect of dissolving these little plates of gold, so as to form a semi-fluid amalgam, which, under the influence of the movement of the different layers of water over one another, rapidly assumes the spheroidal state, the most favorable for precipitation.

From the foregoing principles it results that by treating pulverized gold ore with a solution of bichloride of mercury, or any soluble salt of mercury, and causing the particles of gold to come into intimate and absolute contact with iron, thereby effecting the decomposition of the salt and the precipitation of the metallic mercury upon the gold of the ore, a mass will be obtained containing, in diffusion or suspension therein, no more native gold, but gold amalgam, which acts as already specified.

This operation can be performed in apparatus of any ordinary or suitable construction, in which the ore in the mercurial solution is or can be brought in contact with the iron. When bichloride of mercury is employed, chloride of sodium or hydrochloric acid should be added to prevent the formation of protochloride of mercury, (calomel,) which precipitates. The ore treated as just described, and held in suspension in water, being passed over an amalgamated plate, or a series of such plates, the globules of amalgamated gold will precipitate and adhere thereto, remaining fixed, while the waste will be carried off by the water.

The manner of carrying my invention into effect will perhaps be more clearly and readily understood from the following description.

The ore—say auriferous schist—is finely pulverized and mixed with a solution of bichloride of mercury, (corrosive sublimate,) or other soluble salt thereof, in a mixing apparatus of any ordinary or suitable construction, where it is reduced to the state of pulp.

The quantity of the salt employed is such that the mercury therein is at least sufficient to amalgamate the gold of the ore, and to this end it is well to make the calculation so that the weight of mercury is equal to that of the gold to be fixed. When bichloride of mercury is employed, as already stated, chloride of sodium or hydrochloric acid is added to the solution in small quantities. From the mixer the pulp flows into the amalgamating apparatus. This latter should be of iron or contain iron, but may be otherwise of any desired construction. A large number of machines now used as crushers or disintegrators, for example, suitably modified, can be employed. The apparatus should be perfectly tight, and the pieces with which the pulp comes in contact of wrought or cast iron. Cast-iron wheels turning on a horizontal axis, or spheres rolling in a circular track of the same metal, or cast-iron millstones disposed horizontally, like the stones of a mill, may be used, and also other kinds of machines modified or constructed in a similar way. The iron parts of the apparatus will thus, it is seen, come into intimate contact with the particles of gold.

After suitable time, all the gold having been amalgamated, the operation in the amalgamator will be complete. This will be the case when the liquid no longer gives, with the iodide of potassium, a red-orange precipitate. One or more plates of any suitable metal are amalgamated by the decomposition of a soluble salt of mercury, through the aid of galvanic current from a separate battery, or by galvanic action set up in the solution by the contact of the plate with one of iron or other suitable metal.

From the amalgamator the ore, treated as described, suspended in water, is allowed to flow over the amalgamated plate or plates, set in a suitable apparatus or frame, upon which the globules of amalgamated gold are collected. The amalgam is afterward removed and the mercury separated, as will be readily understood by one skilled in the art. The "fixation" apparatus, in which the collecting-plates are placed, may be of any suitable construction, and no special or minute description is deemed necessary.

My invention is not limited to the treatment of gold. It is applicable to silver and to metals generally which are amalgamable. It is not confined to ores, but may be used to recover metals from all sorts of materials.

Instead of forming the amalgamated plates as described, they may be made in any known or desired way.

In the preliminary amalgamation an excess of mercury salt is not objectionable nor attended with waste. I would remark that in the trials I have made I have always employed a mercurial solution containing a weight of mercury sensibly greater than was necessary, and with the following results: First, after a sufficient trituration in the amalgamator the whole of the mercury was preciptated; second, in the collecting or fixation apparatus the whole of the gold amalgam, and also the whole of the mercury precipitated in excess, were received without loss.

The waters, therefore, which carry off the wastes contain no trace of mercury, and can be evacuated into a river without danger to the river folk or loss of metal to the miners.

Having thus explained the nature of my invention and the manner in which the same is or may be carried into effect, what I claim, and desire to secure by Letters Patent, is—

1. The method of separating gold and other amalgamable metals from ore or other foreign matters by thoroughly mixing the pulverized ore with a solution of a soluble salt of mercury, in the proportion specified, and then subjecting the mixture to the action of grinding or triturating surfaces of iron, so as to bring each part of such mixture into intimate contact with iron, and finally collecting the amalgamated particles, substantially as described.

2. The method of amalgamating gold or other metal by thoroughly mixing the pulverized ore or other material containing the gold or other metal with a solution of corrosive sublimate, in proportions specified, adding thereto common salt or hydrochloric acid, and subjecting the mixture to the action of grinding or triturating surfaces of iron, so as to bring each particle of the mixture into contact with iron, substantially as described.

DESIGNOLLE.

Witnesses:
JOHN NORRIS,
POZZO DI BORGO.